United States Patent
Florent et al.

(10) Patent No.: US 7,068,831 B2
(45) Date of Patent: Jun. 27, 2006

(54) IMAGE PROCESSING METHOD AND SYSTEM FOR EXTRACTING A STRING OF POINTS FOLLOWING A THREADLIKE STRUCTURE IN A SEQUENCE OF IMAGES

(75) Inventors: Raoul Florent, Ville d'Avray (FR); Lucille Goubet, Rueil-Malmaison (FR)

(73) Assignee: Koninklijke Philips Electronics, N.V., Eindhoven (NL)

( * ) Notice: Subject to any disclaimer, the term of this patent is extended or adjusted under 35 U.S.C. 154(b) by 663 days.

(21) Appl. No.: 09/942,004

(22) Filed: Aug. 29, 2001

(65) Prior Publication Data

US 2002/0054701 A1  May 9, 2002

(30) Foreign Application Priority Data

Aug. 31, 2000 (EP) ................................. 00402409

(51) Int. Cl.
*G06K 9/00* (2006.01)
(52) U.S. Cl. ...................... 382/132; 382/199
(58) Field of Classification Search ................ 382/132, 382/199, 128, 130, 203, 205, 256, 257, 195
See application file for complete search history.

(56) References Cited

U.S. PATENT DOCUMENTS 5,056,524 A * 10/1991 Oe .............................. 600/431
5,253,169 A * 10/1993 Corby, Jr. .................... 600/431
5,289,373 A * 2/1994 Zarge et al. ................. 600/434
5,999,651 A    12/1999 Chang et al. ................ 382/215
6,263,089 B1 * 7/2001 Otsuka et al. ............... 382/107
6,335,985 B1 * 1/2002 Sambonsugi et al. ....... 382/190
6,480,615 B1 * 11/2002 Sun et al. .................... 382/103

FOREIGN PATENT DOCUMENTS

WO    WO0039753    7/2000

OTHER PUBLICATIONS

Mikic et al., "Segmentation And Tracking In Echocardiographic Sequences: Active Contours Guided By Optical Flow Estimates," IEEE Transactions On Medical Imaging, IEEE Inc. New York, US, vol. 17, No. 2, Jan. 4, 1998, pp. 274-284.

* cited by examiner

Primary Examiner—Joseph Mancuso
Assistant Examiner—Craig Kronenthal

(57) ABSTRACT

An image processing method for extracting a threadlike structure (GW) represented in an image, comprising a phase of acquisition (10) of a sequence of images, including an image of a present instant (t) in which the threadlike structure is to be extracted and an image of a past instant (t-1) in which the threadlike structure is detected as a string of points ($G_{t-1}$), and further comprising a phase of prediction (20) of a silhouette ($\hat{G}_t$) of the threadlike structure estimated from said detected string of points ($G_{t-1}$), of the image of the past instant, a phase of pursuit (30) for extracting a final string of points ($G_t$) representing the threadlike structure in the image of the present instant t, including steps of estimation of constraints ($C2_t$, $\theta$) based on said silhouette ($\hat{G}_t$) for performing said extraction.

19 Claims, 3 Drawing Sheets

IMAGE PROCESSING METHOD AND SYSTEM FOR EXTRACTING A STRING OF POINTS FOLLOWING A THREADLIKE STRUCTURE IN A SEQUENCE OF IMAGES

The invention relates to an image processing method and to an image processing system for extracting a path following a threadlike structure in a sequence of images. The invention further relates to a medical examination apparatus for carrying out said method using said system. The invention finds for example its application in the medical field of cardiology, for guide-wire extraction in X-ray fluoroscopic images or for thin vessel extraction in arteriograms.

A method for extracting threadlike structures is already known from the patent application WO 00/39753. This document describes an image processing method and an X-ray apparatus having processing means for extracting a threadlike structure represented on the background in a noisy digital original image, including steps for acquiring said original image data and reducting said original image while using a transformation operation so as to provide a reduced image, and in said reduced image, steps for selecting the most probable locations of guide-wire points by selecting, at each point, the direction of the guide-wire as the best match with one of several predetermined regularly oriented directions, and by probing the contrast around and in said selected directions. Then, in the original image, the method has steps for probing the contrast around said selected locations, and extracting the points that satisfy a contrast condition, connecting the points that also satisfy a connectivity criterion in the reduced image, and extracting said points as guide-wire points of the original image.

This known method is available for the extraction of guide-wires that were designed several years ago, or for the extraction of vessels that are not too thin. Now, the most recently designed guide-wires are much thinner than the former guide-wires. And now, the practitioners are much more demanding about the resolution of very thin vessels. So, this method, which processes one image at a time, would present a calculation load actually heavy for real time processing of a sequence of images if the steps were to be applied to images requiring still higher sensitivity and selectivity. As a matter of fact, in cardiology, medical procedures using catheters deeply rely on the correct visibility of the guide-wire, which is a metallic wire introduced in a vessel for guiding the catheter. The guide-wire extraction is the detection and the location of the points belonging to said guide-wire in an arteriogram image. The newly designed type of guide-wires is much more difficult to visualize in a noisy fluoroscopic image than the former type of guide-wires. However, it is vital for the patient that the practitioner exactly visualizes the guide-wire that is moved in the artery. That is the reason why the method and system to extract a guide-wire must be adapted to the newly designed guide-wires. Also, for the application of new medical techniques, the extraction of thin vessels must be improved. An example is in cerebral arteriography. The known method is apt to be carried out in real time but it does not meet the requirements due to the above described new techniques and technologies. It is not precise enough and robust enough to extract such thin threadlike structures.

It is an object of the invention to propose a method precise and robust to extract threadlike structures according to the requirements of the present techniques and technologies. Such a method is claimed in claim 1. This method is carried out using temporal information, which is provided by a sequence of images. It is to be noted that the introduction of a guide-wire, or the observation of thin vessels are operations that can take one or several hours. These operations are registered by forming sequences of images on which the practitioner follows the procedures. As these images are noisy, they are processed to extract the objects of interest. Regarding guide-wire procedures, the guide-wire is introduced in the artery and moved forward at an irregular pace, with episodes of very slow motion or immobility alternating with episodes of faster motion. This particular way of moving the guide-wire is taken advantage of for processing an image of the past, in a sequence of images, or a few number of images of the past, besides the image observed at the instant of the present, in order to extract precisely and robustly the threadlike structure in said present image processed in real time. According to the principle of the invention, temporal information is detected in at least one image of the past of the sequence and is used to calculate prediction data. Said prediction data is further used for improving the guide-wire extraction in a subsequent image at the instant of the present. In other terms, the temporal information is acquired in a first mode, labeled acquisition mode, and is processed for detecting a "silhouette" of a threadlike structure from at least one image of the sequence acquired prior to the instant of the present. The "silhouette" is further processed, in a second mode, labeled pursuit mode, in order to provide a restrained zone in which the threadlike structure is precisely and robustly extracted in the image of the sequence formed at the instant of the present. Besides precision and robustness, the advantage of the method is that the processed image is provided in real time using information that is acquired in a time delay not necessarily compatible with real time. It is also an object of the invention to propose a system to carry out said method and a medical examination apparatus using said system.

The invention is described hereafter in detail in reference to diagrammatic figures wherein.

The invention relates to a method for extracting a path following a threadlike structure represented in a sequence of noisy images. In the example described hereafter, the threadlike structure is a guide-wire denoted by GW represented in an arteriogram sequence formed in fluoroscopy. It is an object of the invention to provide such a method to extract the guide-wire points in the form of a string of points, in the case when high resolution and high precision is required, by using temporal information.

Figure 1:
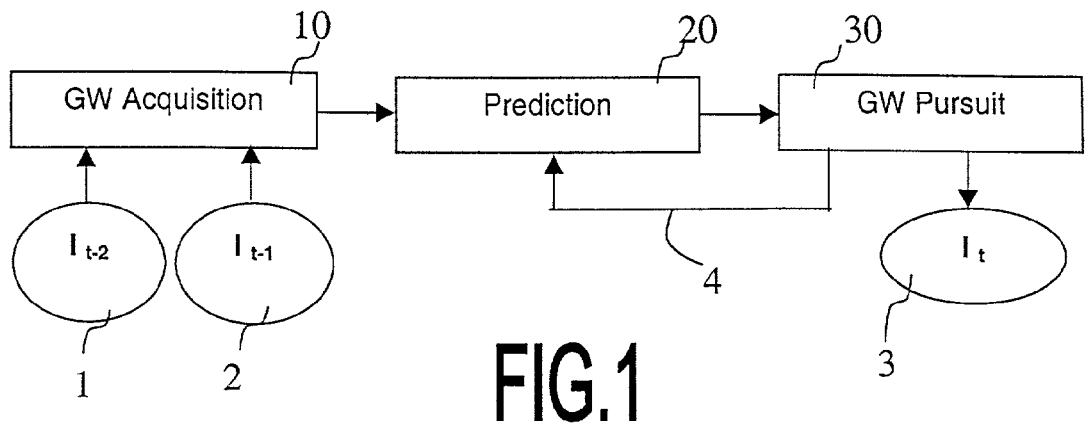
FIG. 1 is a functional block diagram of the main steps of the method.

Referring to FIG. 1, which is a functional block diagram, the method of the invention comprises:

a first phase 10, labeled "acquisition mode", which processes an original image 1 or 1, 2 of the sequence formed at a first instant; the original image is formed of image data including point coordinates and a luminance intensity value for each image point denoted by X; in the acquisition mode, at said first instant, a location of the guide-wire in said original image is detected; said detected guide-wire is a first string of points;

a second phase 20, labeled "prediction mode", which calculates, from the location detected during the first phase, a prediction of the location of the guide-wire, labeled "silhouette" to be used in a further phase of extraction of the guide-wire; the operation of the first and second phases may outlast the time delay imparted for real time processing of an image in the image sequence, which time depends on the image rate in the sequence; the silhouette is a string of points;

a third phase 30, labeled "pursuit mode", which processes an image 3 of the sequence formed at a subsequent second instant, called present instant t, for extracting the guide-wire at said present instant t, using the silhouette information, and using a time delay compatible with real time processing; the extracted guide-wire is the best possible string of points for representing the guide-wire.

More generally, the present method is temporal and uses two or several images of an image sequence, comprising at least a first image 2, from which the silhouette is detected, said first image being formed at a first instant, called instant of the past, and a second image 3, from which the guide-wire is extracted, said second image being formed at a second instant called present instant t. In a variant, the silhouette may be detected by processing two subsequent images formed at instants of the past, that is anterior to the present instant. Setting t as the present instant, the silhouette may be detected from images 1 and 2 of the sequence formed at instants t-2 and t-1. These methods present several advantages. They are more robust a the known method, labeled spatial processing method, which extracts the guide-wire using only one image uniquely formed at the present instant, because more information is available from the processing of several images including images of the past. The calculation time for extracting the guide-wire at the present instant is minimized since the location and the kinetics of the guide-wire are already known from the results of the acquisition and prediction modes. The guide-wire may be extracted very precisely in a very short time by processing a limited zone around the predetermined silhouette.

Figure 2A:
FIG. 2A illustrates the information obtained at one instant of the past, and the silhouette derived from said information.
Figure 2B:
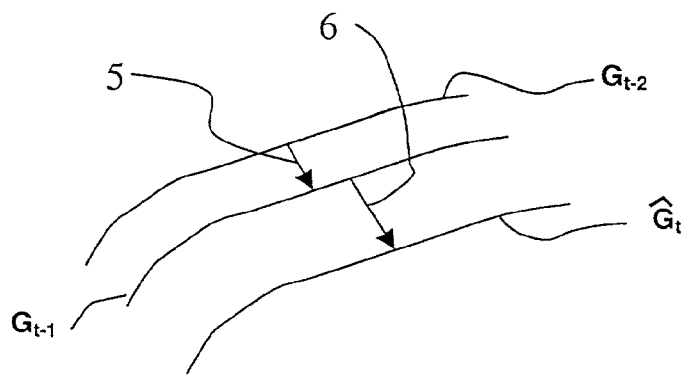
FIG. 2B illustrates the information obtained at two instants of the past, and the silhouette derived from said information.

Referring to FIG. 2A, in the acquisition mode 10, it may be chosen to process only one sequence image 2 denoted by $I_{t-1}$ formed at the instant t-1, where t is the present instant. In this case, only the location of the guide-wire at the instant t-1 is detected. This location is denoted by $G_{t-1}$. Referring to FIG. 2A, in the prediction mode, the detected location $G_{t-1}$ of the guide-wire constitutes the silhouette labeled $\hat{G}_t$, so that $\hat{G}_t = G_{t-1}$. Referring to FIG. 2B, in the acquisition mode 10, preferably, it may be chosen to process two sequence images 1, 2, denoted by $I_{t-2}, I_{t-1}$, respectively formed at instants t-2 and t-1, where t is the present instant. In this case, the location of the guide-wire at the instant t-2 is denoted by $G_{t-2}$, its location at the instant t-1 is denoted by $G_{t-1}$. In the acquisition mode, the location(s) $G_{t-2}$ and/or $G_{t-1}$ of the guide-wire at the instants t-2, t-1 is (are) detected using a known spatial extraction method.

Referring to FIG. 2B, in the prediction mode, the translation value, represented by the arrow 5, between the location $G_{t-2}$ at t-2 and the location $G_{t-1}$ at t-1 is calculated, which permits of calculating the speed of translation of the guide-wire between the instants t-2 and t-1, and the translation value, represented by the arrow 6, between the instant t-1 and the present instant t. These calculations provide a calculated location of the guide-wire, labeled silhouette $\hat{G}_t = P(G_t)$, at the instant t, where P is a prediction function. In the prediction mode, the translation values may be calculated using techniques known of those skilled in the art, such as a "distance map" technique.

Figure 3A:
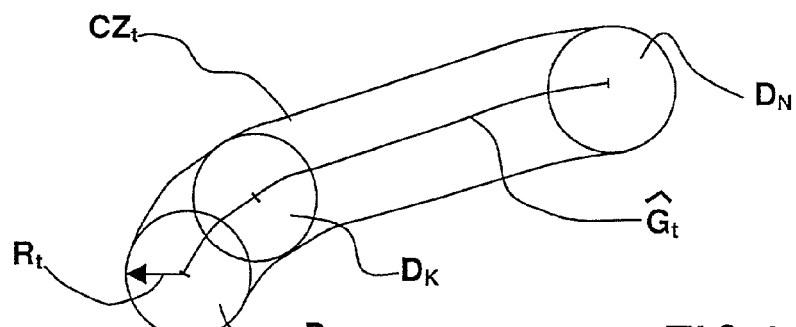
FIG. 3A illustrates the estimation of a constraint formed by the Canal Zone.

Referring to FIG. 3A, in the pursuit mode 30, the silhouette $\hat{G}_t$ is considered in the sequence image formed at the instant t, and a process of extraction of the guide-wire $G_t$ is carried out from said silhouette $\hat{G}_t$. This pursuit mode comprises a procedure of estimation of constraints for performing the extraction operation based on the silhouette $\hat{G}_t$ information. This constraint estimation comprises an estimation of a Search-Zone. The resulting constraint is labeled Search-Zone Constraint. Preferably, the Search-Zone is a canal-shaped zone, labeled Canal Zone, around the silhouette $\hat{G}_t$. The Canal Zone is defined for example using a morphological dilation as illustrated by FIG. 3A. The geometrical locus where the silhouette $\hat{G}_t$ is the center of discs $D_K$ (or spheres) is determined. To this end, for each point K of the silhouette $\hat{G}^t$, a disc $D_K$ from $D_1$ to $D_N$, is defined, centered on said silhouette $\hat{G}_t$. The discs $D_K$ have a predetermined radius $R_t$. The union of all the discs $D_K$ from $D_1$ to $D_N$ defines the Canal Zone $CZ_t$, which is used as a restriction zone to look for the location of the guide-wire $G_t$ at the instant t. This procedure of calculating the Canal Zone results in that the further step of extracting the guide-wire $G_t$ in said Canal Zone is more efficient than a procedure without such a search zone, and is more robust because less sensitive to false locations, which are false extracted points of the finally extracted guide-wire $G_t$.

The guide-wire extraction in the pursuit mode 30 may be carried out using a first technique comprising steps of extraction of a string of points using only the Canal Zone data, that is only extracting the guide-wire points when these points are located in the Canal Zone. In this first technique, the extraction operation is only submitted to one restriction condition called Canal Zone constraint, the Search-Zone being constituted by the Canal Zone $CZ_t$. The guide-wire extraction in the pursuit mode 30 may be carried out using a second technique, comprising steps of extraction of a string of points using not only the restriction condition constituted by the Canal Zone constraint, but also a restriction condition on the directions along which the guide-wire may be looked for, which is called Direction constraint. The candidate points for the guide-wire extraction are associated to a constrained interval of directions denoted by $\Delta\theta$. A point is extracted under the condition that a direction associated to said point belongs to said direction interval $\Delta\theta$ defined as explained thereafter.

Figure 3B:
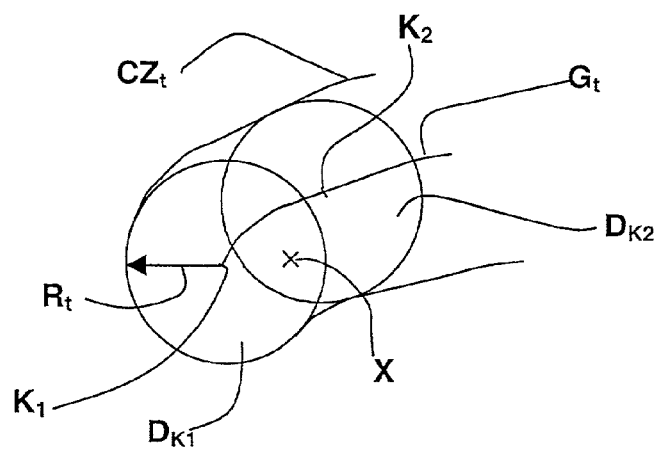
FIG. 3B illustrates the estimation of a constraint formed by the interval of directions.
Figure 3C:
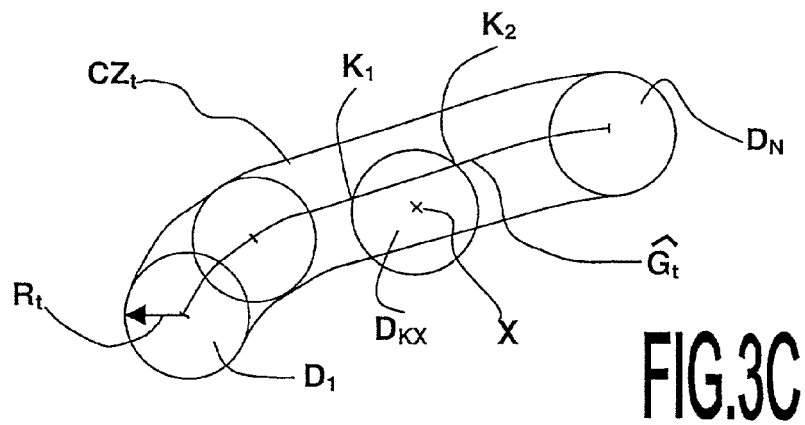
FIG. 3C illustrates a variant of the estimation of a constraint illustrated in FIG. 3B.

Referring to FIG. 3B, a point X of the Canal Zone $CZ_t$ is considered and an associated direction is looked for. Said point X belongs to a set of discs $D_K$ from $D_{K1}$ to $D_{K2}$ previously defined as having a radius $R_t$ and being centered on the silhouette $\hat{G}_t$. Each of these discs $D_K$ is first associated to the direction of the silhouette $\hat{G}_t$ estimated at its center. In the set of discs, from the first disc $D_{K1}$ including the point X, to the last disc $D_{K2}$ including the point X, as many directions as the number of discs, are defined. These directions constitute a set of directions, forming an interval of directions that is to be considered for estimating the direction associated to said point X. Thus, in the method step illustrated by FIG. 3B, the direction at point X is to be estimated in the constrained interval of directions $\Delta\theta$ defined at the centers of the discs $D_K$ containing X. Referring to FIG. 3C, in a variant, a point X of the Canal Zone $CZ_t$ is considered and an associated direction is looked for. A disc $D_{KX}$ having a predetermined radius, for example equal to the radii of the previously defined discs $D_K$, is determined centered on X. This disc $D_{KX}$ intersects the silhouette $\hat{G}_t$ in two points $K_1$, $K_2$ defining a segment. Each point of this segment of $\hat{G}_t$ is associated to the direction of $\hat{G}_t$ estimated at said point. This operation defines as many directions as the number of points of this segment of $\hat{G}_t$. These directions constitute a set of directions forming an interval of directions denoted by $\Delta\theta$ that is to be considered for estimating the direction associated to said point X. Thus, in the method step illustrated by FIG. 3C, the direction at point X is to be estimated in the constrained interval of directions $\Delta\theta$ defined at the points of a segment having a length defined by the intersection of a disc $D_{KX}$ centered at X, with $\hat{G}_t$.

In both cases of FIG. 3B and 3C, the number of points for determining the constrained interval of directions $\Delta\theta$ is a function of the distance of X to $\hat{G}_t$. When X is far from $\hat{G}_t$, the number of points of $\hat{G}_t$, which is considered to determine the number of directions in the interval $\Delta\theta$, is few and thus directions are severely constrained in a small interval. When X is nearer to $\hat{G}_t$ in the Canal Zone, the number of points of $\hat{G}_t$, which is considered to determine the number of directions in the interval $\Delta\theta$, is larger and thus the number of directions is greater. So, when X is located near to $\hat{G}_t$, the directions are less constrained than when X is farer from $\hat{G}_t$ in the Canal Zone. Other methods of providing a direction constraint for a point X of the Canal Zone may be used for fulfilling this condition.

For extracting guide-wire points, ridges are looked for in the Canal Zone and preferably along the directions belonging to the constrained interval of directions. A ridge is a crest-like structure formed by adjacent points having intensity signals that are maximum in a neighborhood, said points having specific dispositions the ones with respect to the others resulting in specific gradient values with respect to orientations. A ridge point shows a low intensity gradient in a first determined direction in its neighborhood, and shows an intensity gradient that is maximum in a direction perpendicular to said first direction. The more a given structure is formed of points verifying this gradient property, the more the ridgeness measure of the structure is high. Instead of ridges, troughs can be considered in a negative original image for instance obtained by x-ray imaging. In an x-ray negative image, a guidewire is a dark structure on a lighter background. In this case, the calculations for extracting the guide-wire have for an object to extract trough points, which can be determined by measures similar to ridgeness calculations. In ridgeness calculations applied to troughs determination, the estimation of specific intensity gradients that is required for characterizing ridges is still valuable for characterizing troughs. So, in the description of the present method, these calculations are called "ridgeness" calculations, whether they are applied to ridges or troughs in the image. This phase comprises a step of "ridgeness" calculation applied to the image formed at the present instant t. This "ridgeness" calculation is performed by applying on the points of the image at locations restricted to the Canal Zone, filters known as ridge-filters, which determine the points of the ridge structures, or of the troughs. Based on the condition of constraint formed by the constrained direction interval $\Delta\theta$, the ridgeness calculation for a given point X of the Canal Zone is limited to the directions of said interval $\Delta\theta$. So, ridgeness is calculated by this local contrast measurement in said Canal Zone and along the directions limited to the directions of said interval $\Delta\theta$ and the best candidate string of points having the highest ridgeness is further extracted as guide-wire.

Figure 4A:
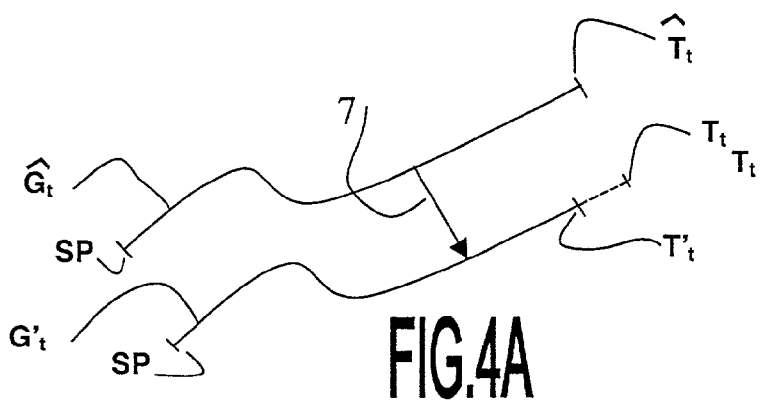
FIG. 4A illustrates the step of tip evaluation and FIG. 4B illustrates the step of shape correlation.

Referring to FIG. 4A, the pursuit mode preferably comprises a step of adjustment of the location of the tip $T_t$ of the guide-wire. Said step of adjustment includes a sub-step of tip evaluation for detecting whether tip adjustment is necessary or not. In order to decide whether the tip found for the detected guide-wire is misplaced resulting in an extracted guide-wire that has a missing part or an exceeding part, the shape of the silhouette $\hat{G}_t$ is compared to the shape of the point string representing the guide-wire, now labeled $G'_t$ in this sub-step, found at the instant t, according to a technique called "shape correlation" as illustrated by FIG. 4A. The tip of $\hat{G}_t$ is denoted by $\hat{T}_t$ and the tip of $G'_t$ is denoted by $T'_t$. The arrow 7 illustrates the translation value between $\hat{G}_t$ and $G'_t$.

Figure 4B:
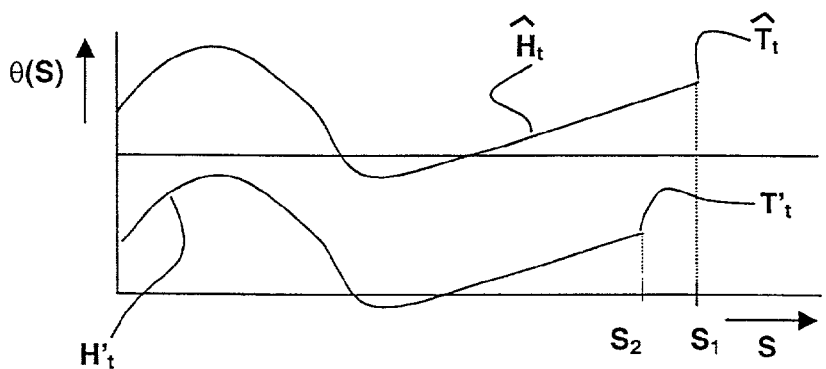

Referring to FIG. 4B, an operation of "elastic matching" is performed between $\hat{G}_t$ and $G'_t$ on a diagram representing a first curve $\hat{H}_t$ corresponding to $\hat{G}_t$ and a second curve $H'_t$ corresponding to $G'_t$. The first and second curves $\hat{H}_t$ and $H'_t$ represent the directions $\theta(S)$ of respectively $\hat{G}_t$ and $G'_t$ at each point of respective curvilinear abscissa S measured in the referential of the corresponding images of the sequence. In a variant, instead of the direction $\theta$, the curvature of $\hat{G}_t$ and $G'_t$ may be estimated in function of said curvilinear abscissa s. The curves $\hat{H}_t$ and $H'_t$ start at a reference point denoted by SP which may be a starting point of detection of the point strings. A best matching of curves $\hat{H}_t$ and $H'_t$ is then performed and the curvilinear abscissa of the tip $\hat{T}_t$ of $\hat{G}_t$ and the tip $T'_t$ of $G'_t$ are compared. Resulting from the comparison, either the point string $G'_t$ is not changed, or it is lengthened, or it is shortened. The final tip is denoted by $T_t$. The resulting point string is subsequently labeled $G_t$ and forms the extracted guide-wire at the present instant t. Said final tip of resulting point string $G_t$ may be estimated using for example a known matching shape method such as the generalized Hough transform, which enables to find a shape from a known gabarit. The silhouette $\hat{G}_t$ may be used as gabarit for detecting the final tip of the resulting point string $G_t$. If the final result is not found satisfying, and iteration illustrated by the arrow 4 in FIG. 1 may be performed between the prediction mode 20 and the pursuit mode 30.

Figure 5:
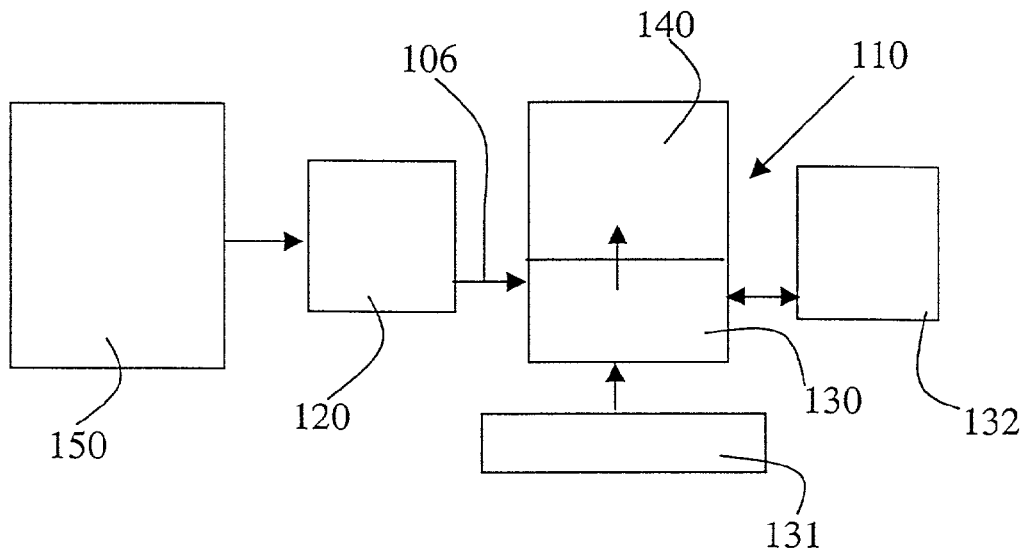
FIG. 5 is a functional block diagram of medical diagnostic imaging system and apparatus for carrying out the method.

Referring to FIG. 5, a medical examination apparatus 150 comprises means for acquiring digital image data of a sequence of images, and a digital processing system 120 for processing these data according to the processing method described above. The medical examination apparatus comprises means for providing image data to the processing system 120 which has at least one output 106 to provide image data to display and/or storage means 130, 140. The display and storage means may respectively be the screen 140 and the memory of a workstation 110. Said storage means may be alternately external storage means. This image processing system 120 may be a suitably programmed computer of the workstation 130, or a special purpose processor having circuit means such as LUTs, Memories, Filters, Logic Operators, that are arranged to perform the functions of the method steps according to the invention. The workstation 130 may also comprise a keyboard 131 and a mouse 132.

The invention claimed is:

1. An image processing method for extracting a threadlike structure (GW) represented in an image, comprising steps of:
  (a) executing a phase of acquisition of a sequence of images, including an image of a present instant in which the threadlike structure is to be extracted and an image of a past instant in which the threadlike structure is detected as a string of points,
  (b) executing a phase of prediction of a silhouette of the threadlike structure estimated from said detected string of points of the image of the past instant,
  (c) executing a phase of pursuit for extracting a final string of points representing the threadlike structure in the image of the present instant t, including estimating a constraint, defined as a search zone, and, defined as the direction of said silhouette, said constraints utilized for performing said extraction, wherein in step (c), the estimation of constraints requires estimation of the search zone in the image of the present instant around the silhouette for constrained extraction of the final string of points in said search zone, and includes the estimation of an interval of directions associated to the points of the search zone, and wherein a neighborhood is estimated for each given point of the search zone so that the neighborhood intersects the silhouette and determines a segment and wherein the directions of the silhouette are determined at each point of the segment, forming a set of directions, which set of directions determines the interval of directions for a constrained extraction of the final string of the points that are associated to an interval of directions.

2. The method of claim 1, wherein in step (b), the silhouette is formed of the string of points detected in the image of the past instant.

3. The method of claim 1, wherein step (a) includes a first image of a first past instant and a second subsequent image of a second past instant, in which the threadlike structure is detected as respective first and second strings of points, and step (b) includes a calculation of a translation value and a speed of translation between the first and second strings of points, wherein the calculation of the translation value occurs between the second past instant and the present instant, and wherein the translation value is utilized for estimating the location of the silhouette in the image of the present instant.

4. The method of claim 1, wherein the search zone is a canal shaped zone, and may be referred to interchangeably as canal zone or search zone, and is centered on said silhouette.

5. The method of claim 1, wherein the search zone is a canal shaped zone which may be referred to interchangeably as search zone or canal zone, and is estimated by an operation of mathematical morphological dilation using discs or spheres of a predetermined radius around the silhouette, including extracting a string of points in said canal zone by ridgeness estimation along the directions of the interval of direction associated to each point and the final string of points is selected from the points having the highest ridgeness.

6. The method of claim 1, wherein step (c) includes evaluating a tip of the extracted string of points to determine whether the tip of the extracted string of points is correctly located for representing the threadlike structure in the image of the present instant.

7. The method of claim 6, wherein step (c) includes correlating a shape for estimating the correct location of a final tip for the final string of points representing the threadlike structure.

8. The method of claim 1, wherein a loop of execution is carried out between step (c) and step (b) for improving the detection of the silhouette and the extraction of the string of points for representing the threadlike structure in the image of the present instant.

9. A system comprising a suitably programmed computer or a special purpose processor having circuit means, which circuit means is arranged to process image data according to the method as claimed in claim 1.

10. A medical examination imaging apparatus having circuit means for acquiring medical digital image data, and having a system which has access to the medical digital image data according to claim 9, the medical examination imaging apparatus further including display means for displaying the medical digital images and the processed medical digital images.

11. A computer program embodied in a computer readable medium comprising a set of instructions for carrying out a method as claimed in claim 1.

12. A method comprising steps of:
(a) acquiring a sequence of images, including at least one present image from which a threadlike structure is to be extracted and at least one past image in which the threadlike structure is detectable as a string of points,
(b) predicting a silhouette of the threadlike structure estimated from the detectable string of points,
(c) extracting a final string of points representing the threadlike structure in the present image, including (i) estimating a search zone in the present image around the silhouette, (ii) estimating a direction for the silhouette, (iii) estimating an interval of directions associated with search zone points, wherein a neighborhood is estimated for each search zone point so that the neighborhood intersects the silhouette, and wherein the direction for the silhouette is determined at each point of silhouette intersection so as to define a set of directions usable to determine the interval of directions for extracting the final string of points that are associated therewith.

13. The method of claim 12, wherein step (a) includes a first past image and a second, subsequent past image, in which the threadlike structure is detected as respective first and second strings of points.

14. The method of claim 13, wherein step (b) includes a calculation of a translation value and a speed of translation between the first and second strings of points, wherein the calculation of the translation value occurs between the second past image and the present image, and wherein the translation value is utilized for estimating the location of the silhouette in the present image.

15. The method of claim 12, wherein the search zone is estimated by an operation of mathematical morphological dilation using discs or spheres of a predetermined radius around the silhouette.

16. The method of claim 12, wherein a loop of execution is carried out between step (c) and step (b) for improving the detection of the silhouette and the extraction of the final string of points for representing the threadlike structure in the present image.

17. A system comprising a suitably programmed computer or a special purpose processor having circuit means, which circuit means is arranged to process image data according to the method as claimed in claim 12.

18. A medical examination imaging apparatus having circuit means for acquiring medical digital image data, and having a system which has access to the medical digital image data according to claim 17, the medical examination imaging apparatus further including display means for displaying the medical digital images and the processed medical digital images.

19. A computer program embodied in a computer readable medium comprising a set of instructions for carrying out a method as claimed in claim 12.

* * * * *